Figure 1:
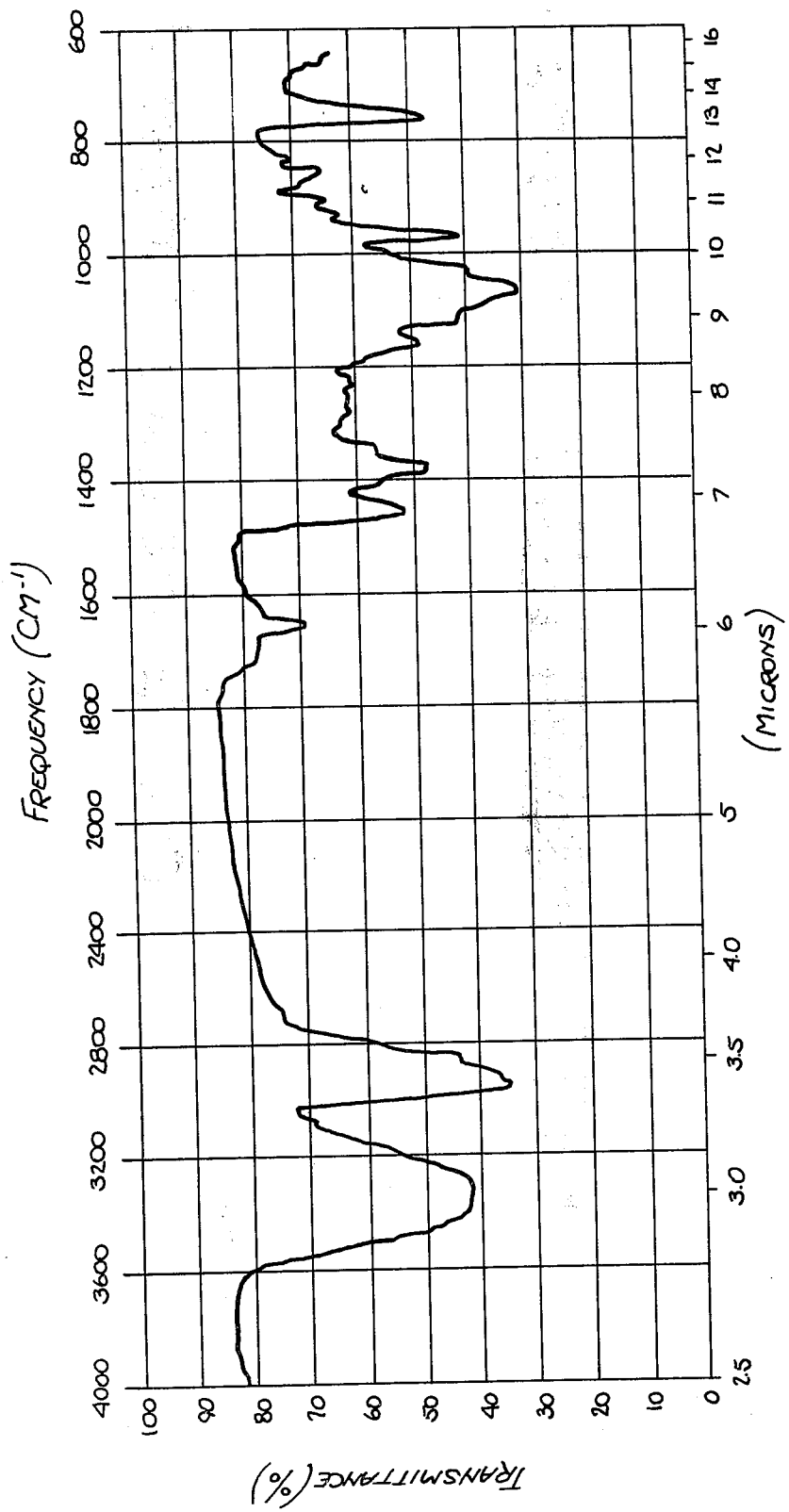

United States Patent [19]
Connor et al.

[11] 3,932,621
[45] Jan. 13, 1976

[54] **TRIOLS AND ACETATES THEREOF DERIVED FROM ANTIBIOTIC SUBSTANCE, ACID S, PRODUCED BY *POLYANGIUM CELLULOSUM* VAR. *FULVUM***

[75] Inventors: David T. Connor, Parsippany; Samuel M. Ringel, Rockaway

[73] Assignees: Max von Strandtmann, Rockaway Township, all of N.J.; Warner-Lambert Company, Morris Plains, N.J.

[22] Filed: June 24, 1974

[21] Appl. No.: 482,054

[52] U.S. Cl. ............................................ 424/122
[51] Int. Cl.² ...................................... A61K 35/00
[58] Field of Search ................................ 424/122

[56] References Cited
UNITED STATES PATENTS 3,651,216   3/1972   Ringel et al. ..................... 424/115
3,804,948   4/1974   Strandtmann et al. ............. 424/122

*Primary Examiner*—Jerome D. Goldberg
*Attorney, Agent, or Firm*—Albert H. Graddis; Frank S. Chow

[57] ABSTRACT

The present invention relates to triols derived from antibiotic substance, designated acid S, produced by *Polyangium cellulosum* var. fulvum (ATCC No. 25532), to the acetates thereof and to processes for the production of the triols and corresponding acetates. These triols and acetates are potent antifungal agents inhibiting the growth of a variety of fungi, including *H. capsulatum*, *T. mentagrophytes* and *M. fulvum*.

7 Claims, 5 Drawing Figures

1,-Methyl Triol S

Triol S Triacetate

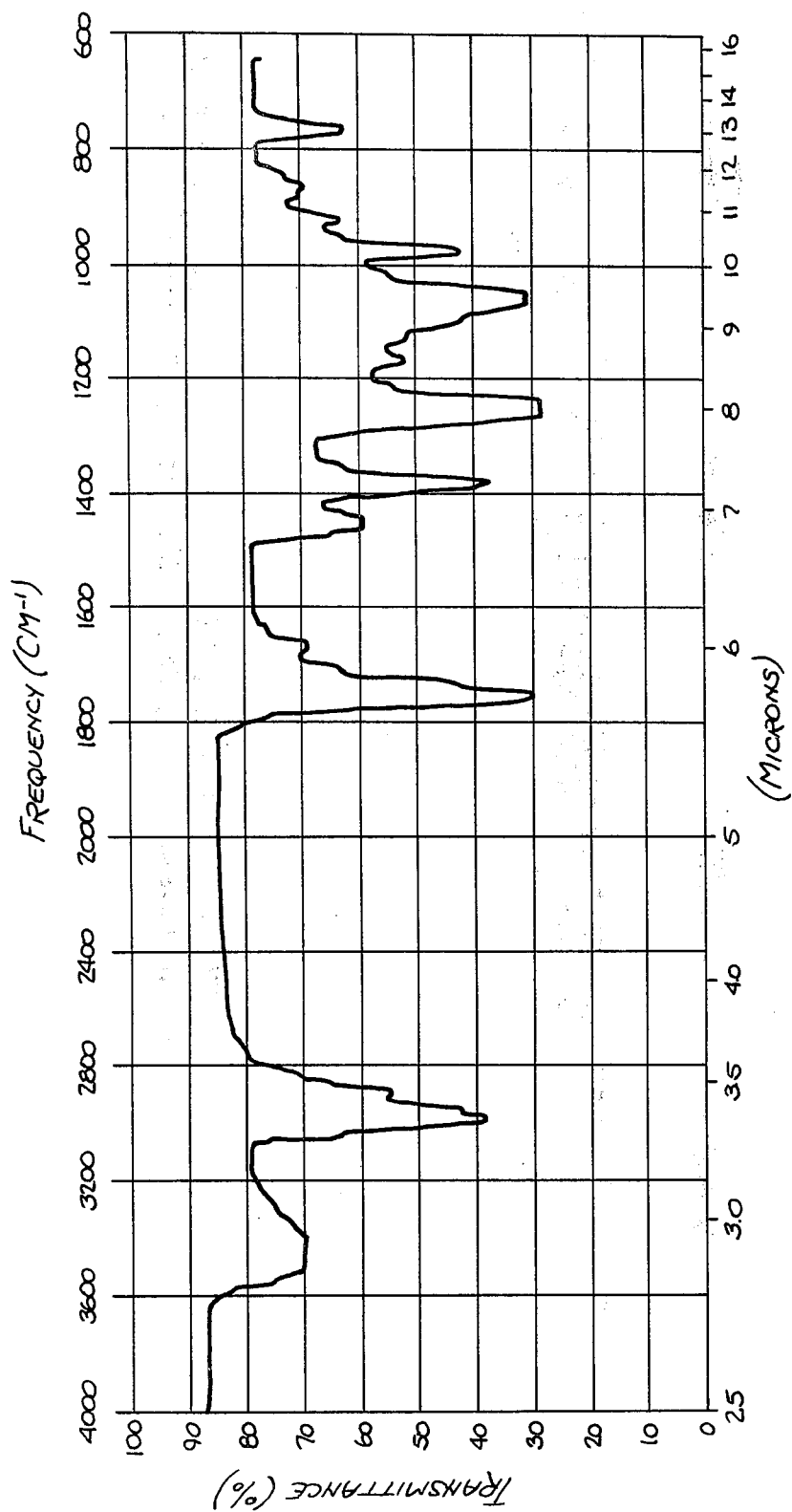

TRIOLS AND ACETATES THEREOF DERIVED FROM ANTIBIOTIC SUBSTANCE, ACID S, PRODUCED BY POLYANGIUM CELLULOSUM VAR. FULVUM

The present invention relates to novel triols obtained from the antibiotic substance known as acid S. Specifically, the present invention relates to triols having molecular formulas $R_1CHR_2OH$, $R_1CR_2R_3$ OH and $R_1CH_2OH$ wherein $R_1$ is $C_{27}H_{39}O_2(OH)_2$ and $R_2$ and $R_3$ are lower alkyl, e.g., methyl or phenyl.

The present invention includes within its scope the acetates of the aforementioned triols. Specifically, the present invention relates to triol acetates having molecular formulas $R_4CHR_2OCOCH_3$, $R_4CR_2R_3OH$ and $R_4CH_2OCOCH_3$ wherein $R_4$ is $C_{27}H_{39}O_2(OCOCH_3)_2$ and $R_2$ and $R_3$ are lower alkyl, e.g., methyl or phenyl.

The instant invention also relates to processes for the preparation of the aforementioned triols and triol acetates and to pharmaceutical compositions exhibiting antifungal activity.

U.S. Pat. No. 3,651,216, issued Mar. 21, 1972, discloses antibiotics, designated A, B and C, formed when *Polyangium cellulosum* var. fulvum (ATCC No. 25532) is fermented in a suitable culture medium. These antibiotics inhibit the growth of fungi and exhibit fungicidal properties.

U.S. Pat. No. 3,804,948, which issued Apr. 16, 1974, describes the chromatographic separation of the antibiotics obtained by the fermentation process disclosed in the aforementioned patent into four chemically distinct antifungal substances, denoted acids F and S and components B and C. Acids F and S and the corresponding methyl esters are also effective antifungals, about 70–90% of the antibiotic activity of the total fermentation product residing in the major components, acids F and S. These isomeric carboxylic acids, acids F and S, were further characterized by physical techniques, such as infrared spectroscopy, polarimetry and thin-layer chromatography, and their molecular formulas were determined by high resolution mass spectrometry.

It has now been found that the triols and triol acetates of the present invention inhibit the growth of a variety of fungi in the serial 2-fold dilution test described in U.S. Pat. No. 3,651,216.

The novel triols of the present invention are prepared from acid S by the processes depicted schematically below:

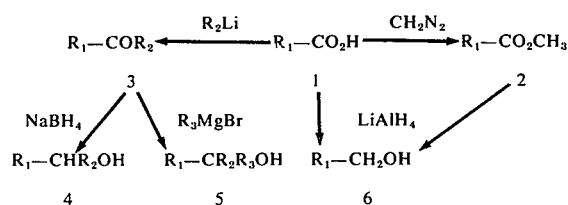

In the above formulas $R_1$ is $C_{27}H_{39}O_2(OH)_2$ and $R_2$ and $R_3$ are lower alkyl or phenyl.

Referring to Scheme 1, triol S, compound 6, is prepared by reducing acid S, compound 1. Typically, acid S is reduced with a metal hydride, such as lithium aluminum hydride in a boiling ethereal solvent, such as tetrahydrofuran. Triol S is also prepared by reduction of acid S methyl ester, compound 2, with a metal hydride in a boiling ethereal solvent under essentially the same conditions. The preparation of acid S methyl ester is described in U.S. Pat. No. 3,804,948.

Triol 4 is obtained by reducing ketodiol 3 with a complex metal hydride, such as sodium borohydride and an alcohol, such as methanol. For example, 1-methyltriol S, compound 4 wherein $R_2$ is methyl, and 1-phenyltriol S, compound 4 wherein $R_2$ is phenyl, are formed when 1-methyl-1-ketodiol S, compound 3 wherein $R_2$ is methyl, and 1-phenyl-1-ketodiol S, compound 3 wherein $R_2$ is phenyl, are treated with sodium borohydride in methanol.

Triol 5 is prepared by condensing ketodiol 3 with an appropriate Grignard reagent in an ethereal solvent. For example, 1,1-dimethyltriol S, compound 5 wherein $R_2$ and $R_3$ are methyl, is formed when 1-methyl-1-ketodiol S is condensed with methylmagnesium bromide in anhydrous diethyl ether. Similarly, 1,1-diphenyltriol S, compound 5 wherein $R_2$ and $R_3$ are phenyl, is obtained when 1-phenyl-1-ketodiol S is treated with phenylmagnesium bromide in diethyl ether.

The starting material, ketodiol 3, for the synthesis of triols 4 and 5 is prepared by condensation of acid S with an alkyllithium in an ethereal solvent. For example, 1-methyl-1-ketodiol S, compound 3 wherein $R_2$ is methyl, is formed when acid S is condensed with methyllithium in anhydrous diethyl ether, and 1-phenyl-1-ketodiol S, compound 3 wherein $R_2$ is phenyl, is obtained when acid S is treated with phenyllithium in diethyl ether.

The aforementioned triols, 1,1-dimethyltriol S and 1,1-diphenyltriol S, are also formed when acid S methyl ester, compound 2, is condensed with an excess of Grignard reagents, such as, methylmagnesium bromide or phenylmagnesium bromide in an ethereal solvent, such as, anhydrous diethyl ether.

The triols of the present invention are recovered from the respective reaction media by methods well-known to those skilled in the art.

The triols of this invention are characterized by infrared spectroscopy and mass spectrometry.

Figure 2:
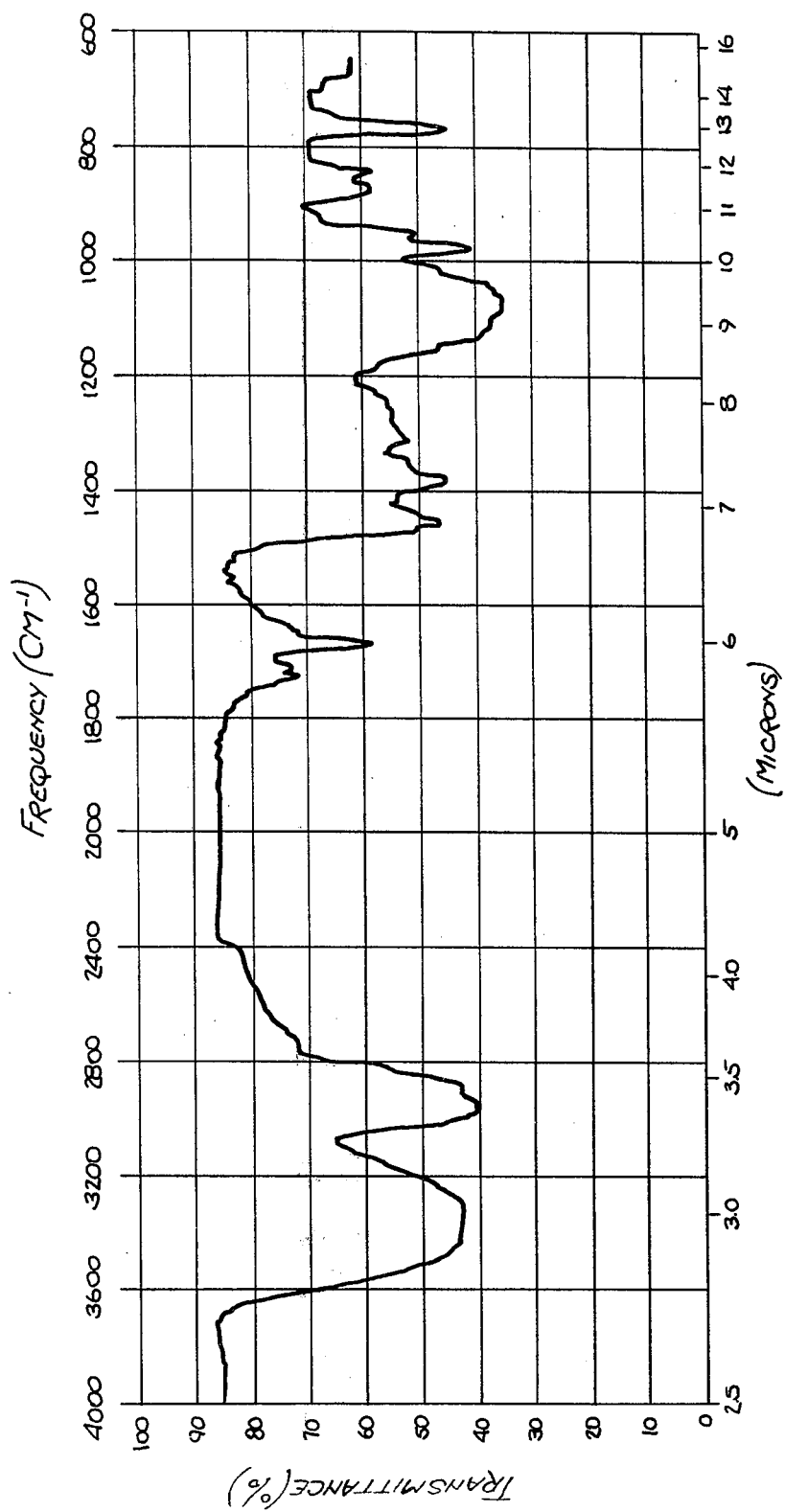
Figure 3:
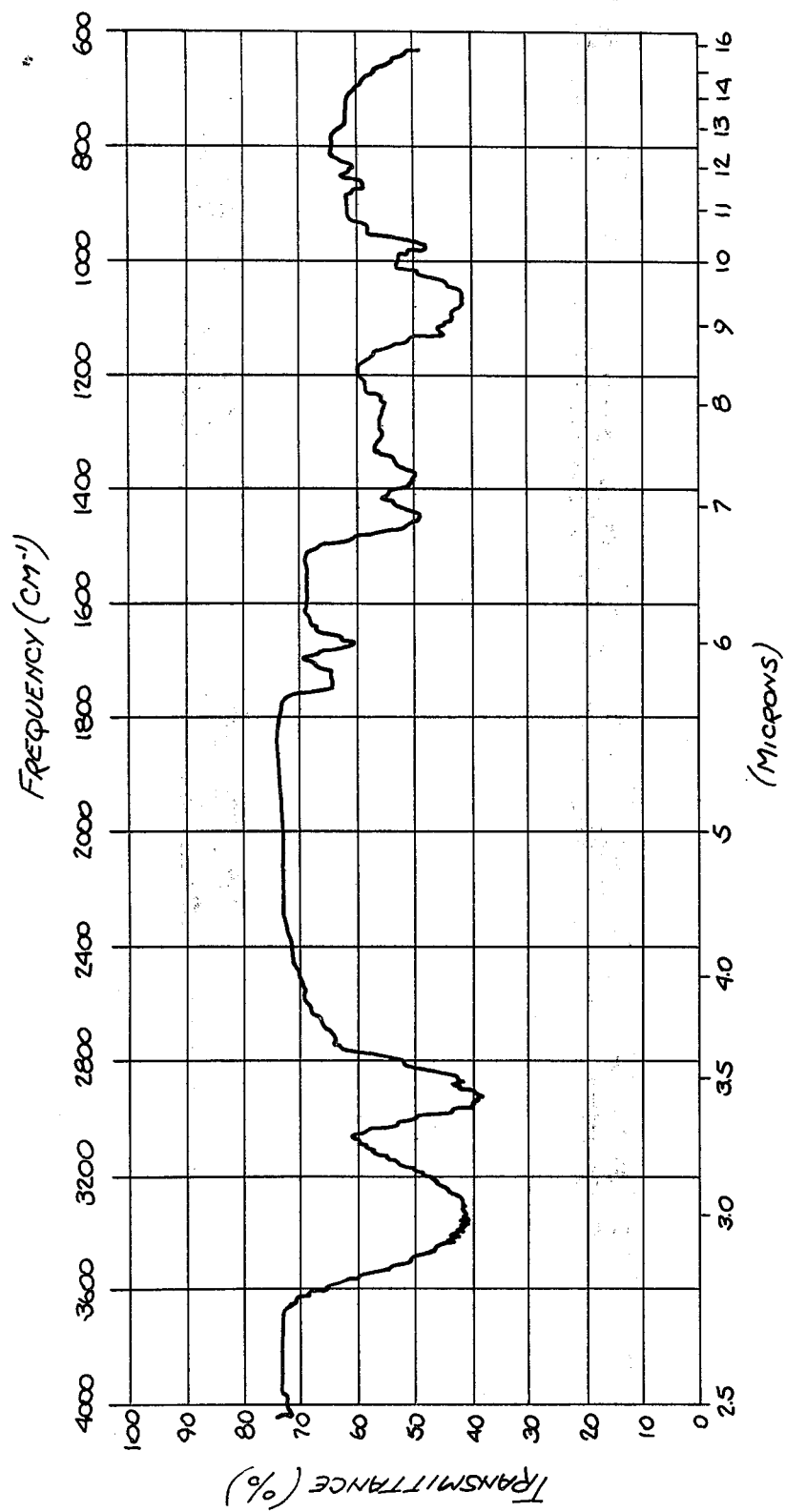

Representative infrared spectra of triols 4, 5 and 6 are illustrated in FIGS. 1, 2 and 3. In general, the spectra are determined as thin films with an infrared absorption spectrometer equipped with a diffraction grating. The spectra are transparent in the carbonyl stretching region (1690 – 1750 cm$^{-1}$) and exhibit absorption bands in the hydroxyl stretching region (3400 – 3200 cm$^{-1}$), associated with the original hydroxyl groups and the hydroxyl group generated by transformation of the carbonyl group of 1,2 or 3. The infrared spectra of acid 1, ester 2 and ketone 3, precursors of triols 4, 5 and 6, exhibit intense absorption bonds in the 1690 – 1750 cm$^{-1}$ region, the carbonyl stretching region.

In addition to providing spectral evidence for the conversion of the carbonyl group of acid, ester and ketone, 1, 2 and 3, respectively, to the additional hydroxyl group of triols 4, 5 and 6, the infrared spectra of triols 4, 5 and 6, represent a characteristic physical property useful for the identification of these compounds.

The mass spectra of triols 4, 5 and 6 of this invention are measured on a double-focusing high-resolution mass spectrometer utilizing a heated direct insertion probe. The molecular composition of the parent peaks are determined by employing perfluorotributylamine (mass spectral grade, available from PCR, Inc., Gainsville, Fla.) as the internal standard and peak matching techniques well-known to those skilled in the art. The application of these mass spectral techniques, permits not only the determination of the molecular composition of the parent ion and confirmation of the postulated transformations, but, like the aforementioned infrared measurements, provides a definitive physical property, characteristic of the triols 4, 5 and 6, and useful for identification purposes.

For example, a comparison of the molecular composition of the parent ion of acid S with that of its lithium aluminum hydride reduction product, triol S shows a loss of 14 mass units, a change in mass units compatible with the change to be expected for the conversion of a carboxylic acid group to a hydroxymethylene function, and an examination of the mass spectrum of the latter having at least 10 high intensity peaks reveals its adequacy as a definitive physical property for identification purposes.

In addition to infrared and mass spectral analysis, the triols of this invention, compounds 4, 5 and 6, were examined on thin layers of silica gel using 85:10:5 ethyl acetate: 2-propanol:water as the solvent system and iodine as the visualization agent. Each alcohol appeared as one well-defined spot under these conditions.

The triols of this invention, triols 4, 5 and 6, are characterized chemically by acetylation as shown schematically below:

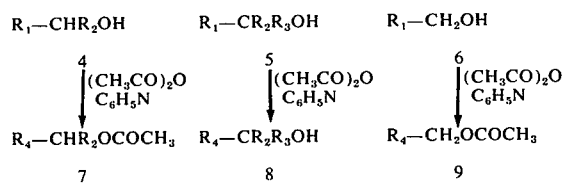

In the above formulas, $R_1$ is $C_{27}H_{39}O_2(OH)_2$, $R_2$ and $R_3$ are as defined, and $R_4$ is $C_{27}H_{39}O_2(OCOCH_3)_2$.

For example, triol S triacetate (9) is obtained when triol S is treated with acetic anhydride in the presence of a tertiary amine such as pyridine, as the acid acceptor, at room temperature for about 16 hours. Similarly, triol triacetate 7 and triol diacetate 8 are formed with triols 4 and 5 and are treated with acetic anhydride under the same conditions.

Like the aforementioned triols of this invention, the corresponding triol triacetates 7 and 9 and triol diacetate 8 are characterized by infrared spectroscopy and mass spectrometry, and analyzed by thin-layer chromatography. The infrared spectra of the triol triacetates and triol diacetates of this invention exhibit intense absorption bands in the 1750 cm$^{-1}$ region, assignable to the acetate carbonyl stretching frequency, and the mass spectra show molecular ions at m/e values which tally with those calculated for the replacement of three protons by three acetyl groups in the triacetates and two protons by two acetyl groups in the diacetates. The infrared and mass spectra of the triol triacetates and triol diacetates are determined utilizing the instrumentation and techniques applied to the determination of the mass and infrared spectra of the corresponding triols. The thin-layer chromatograms of triol triacetates 7 and 9 and triol diacetates 8 are determined by the method used for the chromatographic analysis of the corresponding triols, and present one well-defined spot, indicating homogeneity of the acetylation products.

Figure 4:
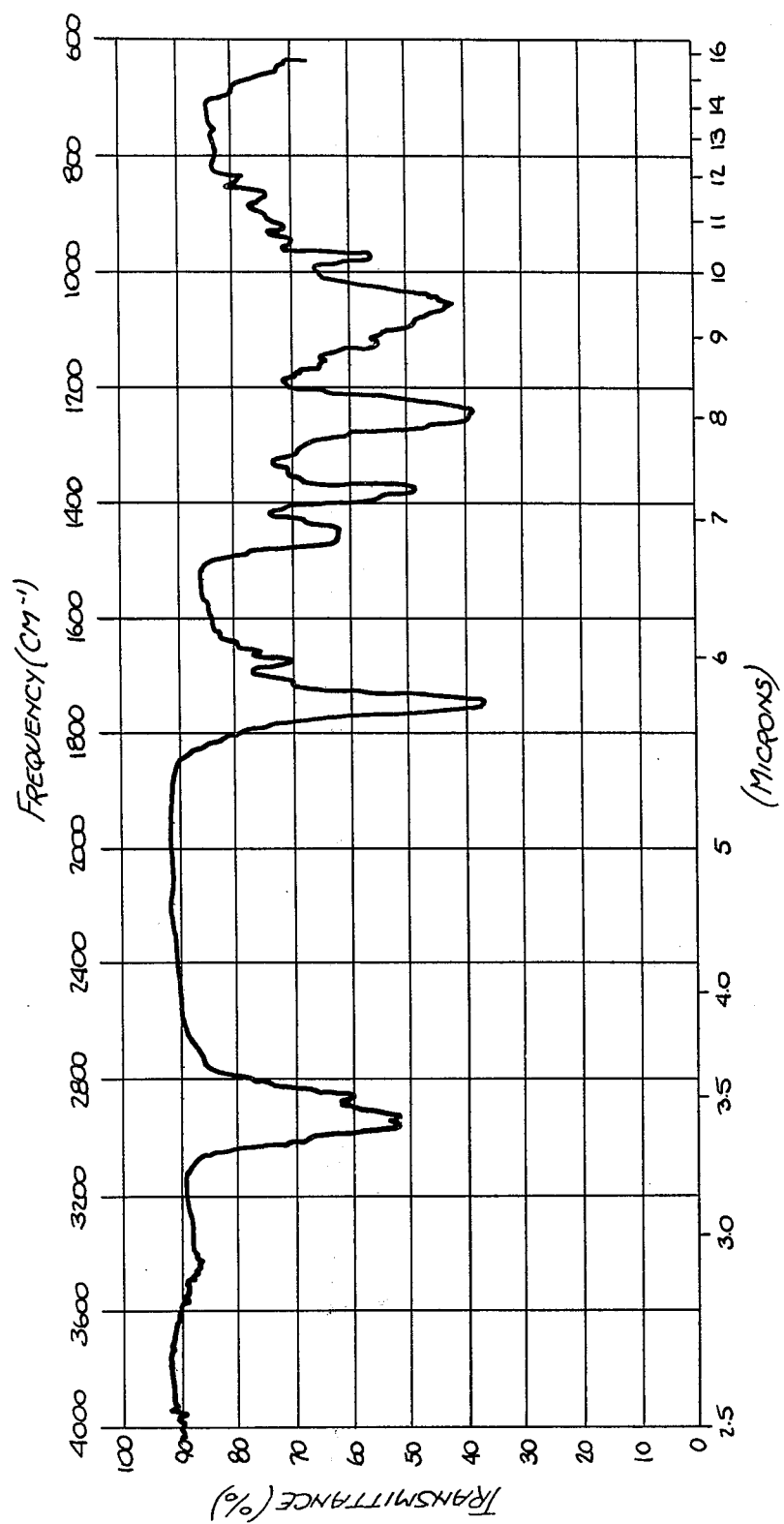

Triol S triacetate (6), for example, showed an infrared absorption band at 1745 cm$^{-1}$, a molecular ion at m/e 586 and a definitive spot on a thin-layer of silica gel. Representative infrared spectra are shown in FIGS. 4 and 5.

In addition to infrared and mass spectral and chromatographic analysis, the triol triacetates 7 and 9 and triol diacetates 6 are characterized by nuclear magnetic resonance spectroscopy. The 220 MHz proton magnetic resonance spectrum of triol S triacetate (6) in deuterochloroform, for instance, shows three 3-proton singlets between 1.99 and 2.05 ppm, assignable to three distinct acetate methyl groups, as well as, multiplets associated with the remaining protons of the compound.

The in vitro antifungal activity of triols 4, 5 and 6, triol triacetates 7 and 9, and triol diacetate 8, was determined by the procedure described in U.S. Pat. No. 3,651,216. The above mentioned triols, and triol triacetates and triol diacetates derived from acid S exhibit antifungal activity against a variety of fungi including *H. capsulatum*, and *M. fulvum*. The aforementioned triols, triol triacetates and triol diacetates were also evaluated by the tube dilution technique according to the method described in U.S. Pat. No. 3,651,216. The minimum inhibitory concentrations of the antifungal triols, triol triacetates and triol diacetates of this invention fall within the range of 50 micrograms/milliliter in this in vitro tube dilution technique.

The compounds of this invention, the aforementioned triols, triol triacetates and triols diacetates, are useful for the treatment of dermatophytic and systemic fungal disease.

The triols, triol triacetates and triol diacetates of this invention can be formulated with inert excipients into various dosage forms for oral, parenteral and topical administration. Among the dosage forms are tablets, capsules, powders, solutions, suspensions, ointments, gels and creams. For topical administration, the triols, triol triacetates and triol diacetates of this invention may be blended with a vehicle such as white petrolatum the weight of the active ingredients being from about 0.1 to 50%. The requisite formulation techniques are well-known to those skilled in the pharmacist's art.

The antifungal triols, triol triacetates and triol diacetates of this invention can be administered orally, parenterally or topically to various mammalian hosts, such as dogs, cats and guinea pigs suffering from fungal infections. The typical dose is about 0.01 to 100 mg/kg of body weight of the animal.

The following examples are not limiting. They are illustrative of the compounds of this invention and methods for preparing same. In the proton magnetic resonance spectra of the example and claim, the symbol H signifies proton.

EXAMPLE 1

Triol S

Lithium aluminum hydride (100 mg) was added to a solution of acid S (100 mg) in tetrahydrofuran (20 ml). The reaction mixture was refluxed with stirring under nitrogen for three hours. The mixture was cooled in an ice-bath, and a few drops of water were added to decompose the excess lithium aluminum hydride followed by about 50 mg of magnesium sulfate. The inorganic solids were filtered off and washed thoroughly with CHCl$_3$. The filtrate and washings were evaporated to give a colorless oil (75 mg). Thin layer chromatography indicated a pure homogeneous product.

Infrared Spectrum $\nu_{max}$ 3300, 1440, 1350, 1050, 1010 and 950 cm$^{-1}$.

Mass Spectrum observed molecular ion 460.3223; calculated for $C_{28}H_{44}O_5$ 460.3189; m/e (relative intensity) 460 (6), 442 (5), 431 (52), 365 (6), 347 (26), 329 (10), 195 (75), 193 (100), 167 (off scale) and 165 (off scale).

EXAMPLE 2

Triol S Triacetate

Triol S was acetylated with acetic anhydride and pyridine according to the method outlined in Synthetic Organic Chemistry by R. B. Wagner and H. D. Zook, John Wiley & Sons, Inc., New York, N.Y., 1953, p. 482, to give triol S triacetate as a colorless oil. Thin layer chromatography indicated a pure homogeneous compound.

Infrared Spectrum $\nu_{max}$ 2950, 2900, 2850, 1740, 1660, 1440, 1370, 1240, 1060 and 960 cm$^{-1}$.

Mass Spectrum m/e (relative intensity) 586 (10), 557 (50), 491 (20), 431 (6), 371 (20), and 193 (100).

Nuclear Magnetic Resonance Spectrum (CDCl$_3$) 0.9 to 1.9 (aliphatic methyl, methylene and methine protons), 1.99 (singlet, 3H), 2.03 (singlet, 3H), 2.05 (singlet, 3H), 3.05 (multiplet, 1H), 3.56 (multiplet, 1H), 3.65 (quartet, 1H), 3.84 (quartet, 1H), 4.08 (broad singlet, 1H), 4.15 (multiplet, 2H), 4.75 (triplet, 1H), 4.98 (multiplet, 1H), 5.06 (quartet, 1H), 5.25 (doublet, 1H), 5.34 (multiplet, 2H), 5.46 (quartet, 1H), and 5.57 (doublet, 1H), ppm.

EXAMPLE 3

1,1-Dimethyltriol S.

A solution of acid S methyl ester (48.8 mg) and a large excess of methylmagnesium bromide (10 equivalents) in anhydrous ether was refluxed under nitrogen for 4 hours. The reaction mixture was cooled and poured onto ice and ammonium chloride. The resulting mixture was extracted with ether. The extracts were dried over MgSO$_4$ and evaporated to give a colorless oil (47 mg). Preparative thin layer chromatography was used for further purification to give a colorless oil (36 mg). Thin layer chromatography indicated a pure homogeneous product.

Infrared Spectrum $\nu_{max}$ 3350, 2950, 1440, 1370, 1150, 1060, 960 and 750 cm$^{-1}$.

Mass Spectrum observed molecular ion 488.3605; calculated for $C_{30}H_{48}O_5$ 488.3509; m/e (relative intensity) 488 (20), 470 (19), 459 (40), 452 (25), 493 (12), 475 (16), 293 (60), 193 (100) and 165 (100).

EXAMPLE 4

1,1-Dimethyltriol S Diacetate 1,1-Dimethyltriol S was acetylated with acetic anhydride and pyridine according to the method of the reference of example 2 to give 1,1-dimethyltriol S diacetate as a colorless oil. Thin layer chromatography indicated a pure homogeneous compound.

Infrared Spectrum $\nu_{max}$ 3300, 2980, 1750, 1450, 1380, 1250, 1060, 980 and 760 cm$^{-1}$.

Mass Spectrum m/e (relative intensity) 572 (11), 554 (5), 543 (44), 525 (3.5), 512 (6), 497 (3), 485 (2), 472 (6), 459 (10), 453 (8), 399 (7), 357 (9), 339 (8), 299 (14), 287 (9), 279 (10), 254 (17), 193 (100) and 165 (100).

EXAMPLE 5

1,1-Diphenyltriol S

A solution of acid S methyl ester (48.8 mg) and a large excess of phenylmagnesium bromide (10 equivalents) in anhydrous ether was refluxed under nitrogen for 4 hours. The reaction mixture was cooled, and poured onto ice and ammonium chloride. The aqueous solution was extracted with ether. The extracts were dried over MgSO$_4$ and evaporated to give a semi-crystalline oil which contained biphenyl. The mixture was extracted with petroleum ether to remove the biphenyl. Preparative t.l.c. gave a pure product as a colorless oil (30 mg).

Infrared Spectrum $\nu_{max}$ 3350, 2900, 1440, 1050, 950 and 740 cm$^{-1}$.

Mass Spectrum observed molecular ion 612.10307; calculated for $C_{40}H_{52}O_5$ 612.09978; m/e (relative intensity) 612 (0.8), 594 (2), 576 (1.5), 572 (2.7), 543 (6), 207 (12), 197 (24), 180 (100) and 165 (55).

EXAMPLE 6

1-Methyltriol S

Sodium borohydride (10 mg) was added to a solution of 1-methyl-1-ketodiol S (47.2 mg) in methanol (5 ml) at room temperature. The reaction mixture was stirred under nitrogen at room temperature for four hours. The methanol was removed under reduced pressure to give a white solid. The solid was dissolved in water and extracted with ether. The extracts were dried over MgSO$_4$ and evaporated to give a colorless oil. Preparative thin-layer chromatography gave the product as a colorless oil (28 mg). Diagnostic thin-layer chromatography indicates a mixture of diastereomers.

Infrared Spectrum $\nu_{max}$ 3300, 2950, 1450, 1380, 1070, 970, 840, 860 and 760 cm$^{-1}$.

Mass Spectrum observed molecular ion 474.0485; calculated for $C_{29}H_{46}O_5$ 474.0528; m/e (relative intensity) 474 (18), 456 (10), 445 (14), 379 (10), 279 (61), and 193 (100).

EXAMPLE 7

1-Phenyltriol S

Sodium borohydride (10 mg) was added to a solution of 1-phenyl-1-ketodiol S (10 mg) in methanol (5 ml) at room temperature. The reaction mixture was stirred under nitrogen at room temperature for four hours. The methanol was removed under reduced pressure to give a solid residue. The residue was dissolved in water and extracted with ether. The extracts were dried over MgSO$_4$ and evaporated to give a semi-crystalline oil (7 mg). Thin-layer chromatography indicates a mixture of diastereomers.

Infrared Spectrum $\nu_{max}$ 3300, 2940, 1450, 1070 and 710 cm$^{-1}$.

Mass Spectrum observed molecular ion 536.0693; calculated for $C_{34}H_{48}O_5$ 536.0690; m/e (relative intensity) 536 (8), 518 (7.5), 507 (7), 474 (3.6), 445 (3.6), 423 (3.6), 347 (14), 341 (28) and 193 (100).

EXAMPLE 8

1-Phenyl-1-ketodiol S

A solution of acid S (100 mg) and phenyllithium (160 mg) in anhydrous ether (6 ml) was stirred under nitrogen at room temperature for four hours. The reaction mixture was poured into ice-water and extracted with ether. The extracts were dried over MgSO$_4$ and evaporated to give a yellow oil. The product was purified using preparative t.l.c. to give a yellow oil (20 mg).

Infrared Spectrum $\nu_{max}$ 3350, 1680, 1600, 1580, 1460, 1380, 1220, 1070 and 980 cm$^{-1}$.

Mass Spectrum observed molecular ion 534.04145; calculated for C$_{34}$H$_{46}$O$_5$ 534.05283; m/e (relative intensity) 534 (5), 516 (8), 505 (7), 498 (3), 487 (2), 439 (6), 421 (6), 348 (9), 347 (14), 323 (11), 287 (40), 235 (16), 193 (100) and 146 (off scale).

EXAMPLE 9

1-Methyl-1-ketodiol S

A solution of acid S (200 mg) and methyllithium (110 mg) in ether (20 ml) was stirred under nitrogen for 4 hours. The reaction mixture was poured onto ice-water and extracted with ether. The extracts were dried over MgSO$_4$ and evaporated to give a yellow oil (93 mg).

Infrared Spectrum $\nu_{max}$ 3350, 1710, 1660, 1450, 1370, 1070 and 970 cm$^{-1}$.

Mass Spectrum observed molecular ion 472.03950; calculated for C$_{29}$H$_{44}$O$_5$ 472.03718; m/e (relative intensity) 472 (2), 454 (1.5), 443 (2.3), 377 (2), 359 (1), 277 (3), 259 (2), 243 (2) and 193 (100).

We claim:

1. An antifungal substance, triol S, prepared by treating acid S (1 equivalent) with lithium aluminum hydride (10 equivalents) in the presence of boiling tetrahydrofuran (200 equivalents) for 3 hours and having the following physical properties:
   a. Mass spectrum m/e (relative intensity) 460(6), 442 (5), 431 (52), 365 (6), 347 (26), 329 (10), 195 (75), 193 (100), 167 (off scale) and 165 (off scale); molecular ion observed: 460.3223; calculated for C$_{28}$H$_{44}$O$_5$: 460,3189;
   b. Infrared Spectrum $\nu_{max}$ 3300, 1440, 1350, 1050, 1010 and 950 cm$^{-1}$.

2. An antifungal substance, triol S triacetate, prepared by treating triol S (1 equivalent) with acetic anhydride (100 equivalents) and pyridine (200 equivalents) at room temperature for 16 hours, and having the following physical properties:
   a. Mass spectrum m/e (relative intensity) 586 (10), 557 (50), 491 (20), 431 (6), 371 (20), and 193 (100);
   b. Proton magnetic resonance spectrum $\delta$0.9 to 1.9 (aliphatic methyl, methylene and methine protons), 1.99 (s, 3H, CH$_3$CO), 2.03 (s, 3H, CH$_3$CO), 2.05 (s, 3H, CH$_3$CO), 3.05 (m, 1H, bis allylic), 3.56 (m, 1H, H—C—O—C), 3.65 (q, 1H, H—C—O—C), 3.84 (q. 1H, H—C—O—C), 4.08 (broad S, 1H, H—C—O—C), 4.15 (m, 2H, —CH$_2$—OAc), 4.75 (t, 1H, —CH—OAc), 4.98 (m, 1H, —CH—OAc), 5.06 (q, 1H, vinyl), 5.25 (d, 1H, vinyl), 5.34 (m, 2H, vinyl), 5.46 (q, 1H, vinyl) and 5.57 (d, 1H, vinyl) ppm;
   c. Infrared spectrum $\nu_{max}$ 2950, 2900, 2850, 1740, 1660, 1440, 1370, 1240, 1060 and 960 cm$^{-1}$;
   d. Molecular formula C$_{34}$H$_{50}$O$_8$; molecular weight 586.

3. An antifungal substance, 1,1-dimethyltriol S, prepared by treating acid S methyl ester (1 equivalent) with methylmagnesium bromide (10 equivalents) in boiling anhydrous diethylether (200 equivalents) for 4 hours, and having the following physical properties:
   a. Mass spectrum m/e (relative intensity) 488 (20), 470 (19), 459 (40), 452 (25), 493 (12), 475 (16), 293 (60), 193 (100) and 165 (100); molecular ion observed: 488.3605; calculated for C$_{30}$H$_{48}$O$_3$: 488.3509;
   b. Infrared spectrum $\nu_{max}$ 3350, 2950, 1440, 1370, 1150, 1060, 960 and 750 cm$^{-1}$.

4. An antifungal substance, 1,1-dimethyltriol S diacetate, prepared by treating, 1,1-dimethyltriol S (1 equivalent) with acetic anhydride (100 equivalents) and pyridine (200 equivalents) for 16 hours at room temperature and having the following physical properties:
   a. Mass spectrum m/e (relative intensity) 572 (11), 554 (5), 543 (44), 525 (3.5), 512 (6), 497 (3), 485 (2), 472 (6), 459 (10), 453 (8), 399 (7), 357 (9), 339 (8), 299 (14), 287 (9), 279 (10), 254 (17), 193 (100) and 165 (100);
   b. Infrared spectrum $\nu_{max}$ 3300, 2980, 1750, 1450, 1380, 1250, 1060, 980 and 760 cm$^{-1}$;
   c. Molecular formula C$_{34}$H$_{52}$O$_7$; molecular weight 572.

5. An antifungal substance, 1,1-diphenyltriol S, prepared by treating acid S methyl ester (1 equivalent) with phenylmagnesium bromide (10 equivalents) in boiling diethyl ether (200 equivalents) for 4 hours and having the following physical properties:
   a. Mass spectrum m/e (relative intensity) 612 (0.8), 594 (2), 576 (1.5), 572 (2.7), 543 (6), 207 (12), 197 (24), 180 (100) and 165 (55); molecular ion observed: 612.10307; calculated for C$_{40}$H$_{52}$O$_5$: 612.09978;
   b. Infrared spectrum $\nu_{max}$ 3350, 2900, 1440, 1050, 950 and 740 cm$^{-1}$.

6. An antifungal substance, 1-methyltriol S, prepared by treating 1-methyl-1-ketodiol S (1 equivalent) with sodium borohydride (10 equivalents) in methanol (200 equivalents) at room temperature for 4 hours, and having the following physical properties:
   a. Mass spectrum m/e (relative intensity) 474 (18), 456 (10), 445 (14), 379 (10), 279 (61), and 193 (100); molecular ion observed 474.0485; calculated for C$_{40}$H$_{52}$O$_5$; 612.09978;
   b. Infrared spectrum $\nu_{max}$ 3300, 2950, 1450, 1380, 1070, 970, 840, 860 and 760 cm$^{-1}$.

7. An antifungal substance, 1-phenyltriol S, prepared by treating 1-phenyl-1-ketodiol S (1 equivalent) with sodium borohydride (10 equivalents) in methanol (200 equivalents) at room temperature for 4 hours, and having the following physical properties:
   a. Mass spectrum m/e (relative intensity) 536 (8), 518 (7.5), 507 (7), 474 (3.6), 445 (3.6), 423 (3.6), 547 (14), 351 (28) and 193 (100); molecular ion observed 536.0693; calculated for C$_{34}$H$_{48}$O$_5$: 536.0690;
   b. Infrared spectrum $\nu_{max}$ 3300, 2940, 1450, 1070 and 710 cm$^{-1}$.

* * * * *